United States Patent [19]

Blasche, Jr. et al.

[11] 4,013,743
[45] Mar. 22, 1977

[54] SPIRAL GRAIN SOLID PROPELLANT FABRICATION PROCESS

[75] Inventors: Thomas L. Blasche, Jr.; Donald D. Kobbeman; Boyce M. Corley, all of Waco, Tex.

[73] Assignee: Rockwell International Corporation, El Segundo, Calif.

[22] Filed: Feb. 12, 1973

[21] Appl. No.: 331,404

[52] U.S. Cl. .............................. 264/3 R; 102/102; 102/103; 149/2; 149/76
[51] Int. Cl.² .............................................. C06B 21/00
[58] Field of Search ............ 86/1 R; 102/102, 103; 149/76; 264/3 R

[56] References Cited

UNITED STATES PATENTS

| | | | |
|---|---|---|---|
| 3,067,686 | 12/1962 | Coover, Jr. et al. | 264/3 R |
| 3,176,618 | 4/1965 | Forsberg et al. | 264/3 R |
| 3,213,793 | 10/1965 | Dratz | 102/103 X |
| 3,256,819 | 6/1966 | Leeper | 102/102 X |
| 3,496,870 | 2/1970 | Fulmer | 149/19 X |
| 3,700,762 | 10/1972 | Carpenter et al. | 264/3 R |

Primary Examiner—Leland A. Sebastian
Attorney, Agent, or Firm—Robert G. Upton; Robert M. Sperry; L. Lee Humphries

[57] ABSTRACT

A solid propellant motor is fabricated by spreading a propellant onto an uncured reinforced fabric tape to a uniform thickness and then partially curing the mass to a semi-rigid state. The semi-rigid blanket is then rolled with an air gap between the spirally wound layers. The final configuration of the motor is subsequently fully cured.

5 Claims, 3 Drawing Figures 4,013,743

SPIRAL GRAIN SOLID PROPELLANT FABRICATION PROCESS

BACKGROUND OF THE INVENTION

1. Field of the Invention

This invention relates to a solid propellant eject motor propulsion device that provides initial boost velocity to a tube-launched missile. More particularly, the invention relates to a method to fabricate a solid propellant grain for an eject motor in a spiral wrap with air gaps between the spirally wound layers, the gaps providing good burn propagation during a short burn time, boost phase firing.

2. Description of the Prior Art

An example of the prior art is found in U.S. Pat. No. 3,159,104 which discloses a method to fabricate a solid propellant motor by utilizing alternate layers of oxidizer-rich and fuel-rich propellants, separated by, for example, metal foil, the whole rocket motor being wound in a sprial pattern, one layer upon the other; thus, spirally wrapping the composite material into the general size desired. This patent suffers in that it has layers of oxidizer-rich and fuel-rich materials, one on top of the other, with no air space between, thus the composite rocket motor need not have structure-bearing interfaces between layers of propellant. If the layers were separated by an air space, as is taught in the instant invention, then the layers would not withstand the stress imposed on the grain during firing.

U.S. Pat. No. 3,316,842 basically discloses a series of stacked discs that are individually formed and stacked one on top of the other to form a basic solid propellant motor. Each disc is comprised of a layer of a fuel comprising an aluminum metal powder and another layer of an oxidizer, such as ammonium perchlorate, the fuel and the oxidizer being separated by a metallic disc or other suitable non-metallic material. This invention is disadvantaged in that each disc is tightly compacted against the adjacent disc, thus inhibiting the burning properties of the solid propellant motor.

The instant invention, having layers of fuel and oxidizer on adjacent sides of a fiberglass structural separating element, may be cured so that each spiral wrap of the composite solid propellant material has an air space between an adjacent wrap, the structural element between the layers of propellant being sufficiently strong when fully cured to support the spiral wrap with air spaces therebetween. The present invention, therefore, provides a superior fabrication method as well as providing more burning surface to affect the burning rate of the eject motor.

SUMMARY OF THE INVENTION

It is an object of this invention to provide a method to fabricate a solid propellant grain of high-surface-volume-ratio typically usable with tube-launched missiles with structural characteristics to withstand high axial and lateral "G" forces.

More particularly, it is an object of this invention to provide a method and process to fabricate an eject solid propellant grain of large burning surface area for tube-launched missiles by spirally wrapping a composite structure of propellant spread on a reinforced fabric tape partially curing the propellant and tape followed by forming and fully curing the spiral wrap.

The technique used in grain fabrication includes the following steps: Spreading uncured propellant onto a strip of semi-cured epoxy-impregnated fabric (either glass or organic fibers) and precuring or gelling the propellant at a low temperature to a cure state, where the propellant will not flow; then forming the grain into the spiral wrap configuration and curing the structural plastic fabric tape while completing propellant cure. The foregoing process allows for better dimensional control of the propellant web thickness, thus improving reliability and reproducibility.

The reinforced fabric tape may be an epoxy fiberglass tape produced by the 3M Company and designated as Scotchply 1002 and or 2002. However, other types of thermosetting resins, can be applied to the system as well as alternate reinforcing materials. Solid propellant material is applied to both sides of the reinforcing tape. The propellants utilized may be an ammonium perchlorate-oxidized composition containing a carboxy-terminated polybutadiene binder system. Other composite propellants with different binders, such as polybutadiene acrylic acid and polybutadiene acrylonitrile, polyurethane, and nitrocel, can be utilized or a double-base solid propellant can also be adapted to this design.

It is desirable to utilize composite propellant with inherently low temperature sensitivities since many current and future eject motor applications require narrow ballistic limits over a wide temperature range.

Advantage over the prior art is the inherent structural integrity of the reinforcing material once it is cured and formed in a spirally wrapped design which structural integrity maintains the spirally wrapped configuration during the subsequent operational grain burning phase.

Another advantage over the prior art is the resultant maximized grain burning surface provided which gives a high performance, short-burning-time, solid propellant grain suitable for a tube-launched propulsion device that needs high initial boost velocity.

Yet another advantage over the prior art is an eject solid propellant motor that is fabricated so that it is able to withstand high axial and lateral G forces.

The above noted objects and advantages of the present invention will be more fully understood upon a study of the following detailed description in conjunction with the detailed drawings.

DESCRIPTION OF THE PREFERRED EMBODIMENTS

Figure 1:
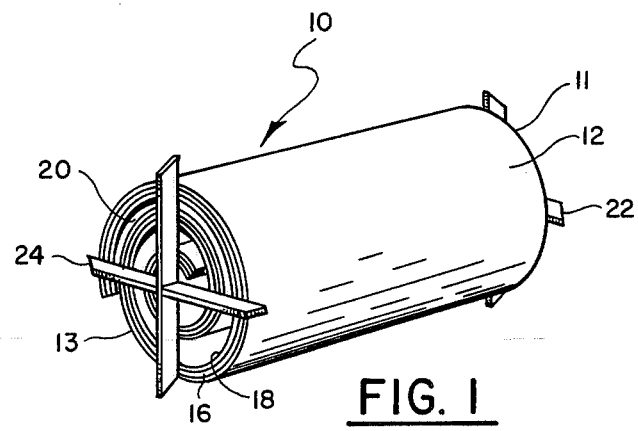
FIG. 1 is a perspective view of a spirally wrapped solid propellant eject motor.

Turning now to FIG. 1, the spirally wrapped eject motor generally designated as 10 is comprised of body 12 having an outer propellant layer 14; an inner support structure or web 16 with still another layer of propellant 18 spread on the opposite side of support web 16. An air space 20 is provided between the composite solid propellant structure to provide ample burning surface for quick burning of the eject motor 10. Adjacent end 11 of body 12 is a crossed support structure 22 that is bonded to the end 11. At the opposite end 13 a similar support structure 24 bonded to end 13 of body 12, the supports 22 and 24 serving to support or position the spirally wrapped configuration of the solid eject motor 10 in a cylindrical motor case (not shown).

Figure 2:
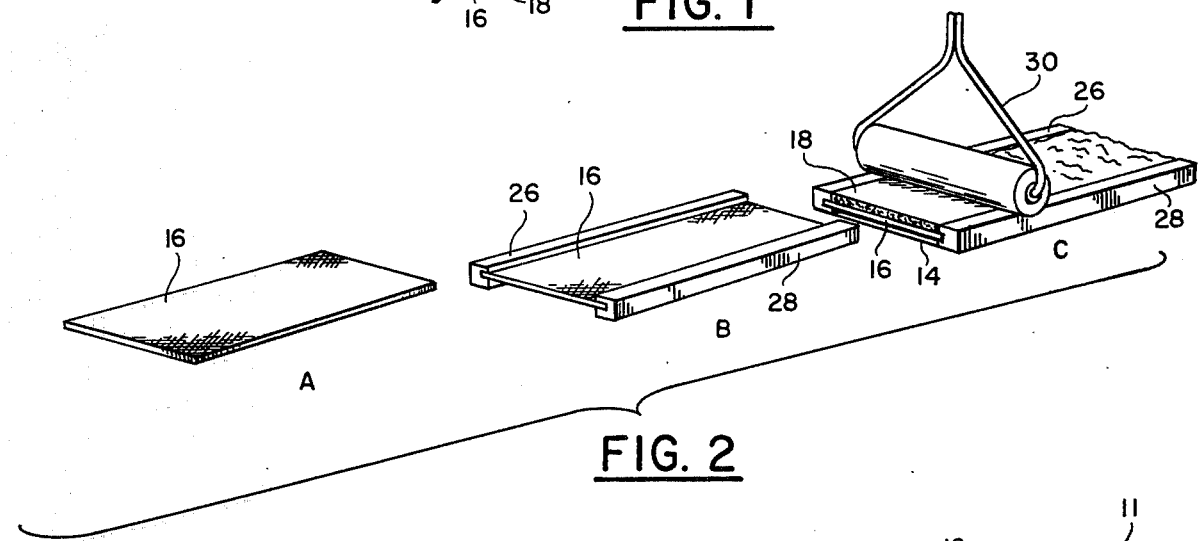
FIG. 2A, B, and C are steps in fabricating the reinforced solid propellant grain showing the steps of applying the solid propellant material onto the reinforcing center web structure.

FIG. 2A is a support structure or web 16 that may be an uncured reinforced fabric tape such as an epoxy-fiberglass tape produced by 3M Company (EC-1002 and EC-2002). Other types of thermosetting resins may be utilized such as phenolic ureaformaldehyde, resorcinal, and polyacrylate, which may be applied to the above reinforcing fabric tape or to alternate flexible reinforcing material such as cotton yarn and/or metal wire, or woven cloth. The uncured reinforced tape is inserted between a pair of support rails 26 and 28, the support rails being slotted down their sides to accept an edge of the uncured reinforcing tape 16. The distance between the surface of the reinforcing tape and the top of the rails 26 and 28 determines the thickness of the solid propellant material that is spread onto the uncured reinforcing tape.

FIG. 2C is illustrative of the layer of solid propellant material 18 being spread between the support rails 26 and 28. A pass of the roller 30 evens out the solid propellant material onto the reinforced tape between the edges of the support rails 26 and 28. The filling and rolling procedure just outlined is repeated on the opposite side to form a layer of solid propellant material 14 on the opposite side of the reinforcing tape 16.

Figure 3:
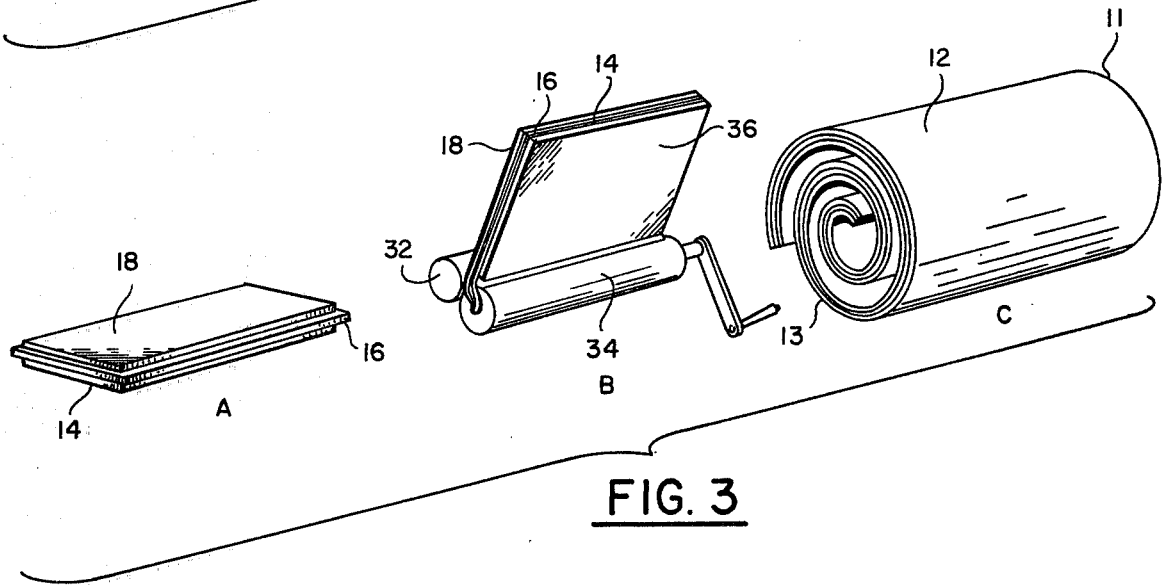
FIGS. 3A, B, and C are further steps in the fabrication of the spirally wrapped solid propellant grain, illustrating the composite solid propellant structure in the precure state, the method of rolling the composite structure with a spacer between layers, and the final configuration of the spirally wrapped composite grain in the fully cured state.

FIG. 3 is a continuation of the fabrication procedure wherein FIG. 3A is a perspective view of the reinforced tape 16 with a layer of solid propellant material 14 on one side and another layer of solid propellant material 18 on the opposite side. The composite structure is in an uncured state. The composition is allowed to precure to a gelling state wherein the propellant will not flow. For example, when utilizing an 80% ammonium perchlorate and 18% carboxy-terminated polybutadiene binder with a suitable curative such as HX-868 (tris 1, 3, 5 [1-2 (ethyl) aziridinyl] benzene carboxamide material, the propellant is allowed to cure for approximately 12 hrs. at about 170° F, thus reaching a gelled state.

FIG. 3B is an illustration wherein the gelled propellant on the partially uncured reinforcing fabric tape 16 is put between a pair of rollers 32 and 34. A spacer block 36 typically made from reinforced epoxy sheets of Scotchply 2002 with Teflon coated aluminum as release sheets adjacent side 14 provides a longitudinally extending air space between the partially cured propellants when it is finally wrapped into the spirally wrapped configuration. The air space acts to provide suitable burning surfaces to the grain. The two rollers then wind the composition with the spacer 36 in between into the spiral wrap as seen in FIG. 3C. The spirally wrapped body 12 is then allowed to cure for 4 hrs. at 300° F. which cures the structural plastic reinforced tape 16, as well as curing the propellant 14, 18 placed on either side of the reinforcing tape. The foregoing process allows for better dimensional control of the propellant web thickness thereby improving reliability and reproducibility.

A preferred example of a solid spirally wrapped solid propellant eject motor fabricated as above would have the following dimensions: the motor grain 10, 2.85 inches long and 2.75 inches in diameter, an 0.06–0.07 inch thick layer of solid propellant on either side of the reinforced plastic tape and a 0.080 to 0.090 inch air gap. The cross members 22 and 24 adjacent ends 11 and 13 are bonded to the ends by epoxy adhesive.

Obviously other design configurations could be used in practicing the present invention. For example, the partially cured composite could be shaped into a sinusodial configuration (not shown) wherein the propellant coated web 16 winds back and forth with air spaces in between layers. The finally cured structure can be supported at its ends as previously described.

We claim:

1. A method of fabricating a spirally wound, solid propellant motor grain with a support structure therein, the improvement comprising the steps of:

spreading a layer of uncured solid propellant onto both sides of a support structure, said solid propellant being an ammonium perchlorate oxidized composition containing a binder system that cures at a relatively high temperature, said support structure being a flexible, uncured, reinforced fabric tape with a thermosetting resin binder thereon that cures at a relatively high temperature, partially curing said uncured solid propellant applied to both sides of said uncured flexible support structure to a gelled state, forming said partially cured solid propellant and support structure into a layered, longitudinally-extending, spirally-wrapped solid propellant motor configuration, said propellant and support structure forming longitudinally-extending, annular air spaces between said layers, and heating simultaneously said finally formed, partially cured solid propellant and said support structure to a fully cured, structurally rigid state.

2. The invention as set forth in claim 1 wherein said solid propellant ammonium perchlorate oxidized composition containing a binder is comprised of 80 percent ammonium perchlorate and 18 percent carboxy-terminated polybutadiene binder with a benzene carboxamide curative, and wherein said uncured, reinforced fabric tape with a thermo-setting resin is an epoxy-fiberglass tape.

3. The invention as set forth in claim 2 wherein said solid propellant on both sides of said support structure is partially cured to a gelled state for 12 hours ± 0.5 hour, at approximately 170° F, after which said gelled solid propellant on said support structure is spirally formed into a final grain configuration, said solid propellant and said support structure being simultaneously cured for 4 hours, ±0.5 hour, at approximately 300° F.

4. The invention as set forth in claim 1 wherein said solid propellant binder system is selected from the group consisting of carboxy-terminated polybutadiene, polybutadiene acrylic acid, and polybutadiene acrylonitrile.

5. The invention as set forth in claim 1 wherein said thermosetting resin binder on said reinforced fabric tape is selected from the group consisting of epoxy, phenolic ureaformaldehyde, resorcinal, and polyacrylate.

* * * * *